United States Patent [19]

Aubakirov et al.

[11] Patent Number: 4,681,174

[45] Date of Patent: Jul. 21, 1987

[54] DIAMOND CROWN BIT

[75] Inventors: Marat T. Aubakirov; Esengali L. Limanov; Askar K. Syzdykov; Ravil S. Abdrazakov; Murat G. Tleuov, all of Alma-Ata; Vladimir S. Khazhuer, Terek; Ruslan D. Buzdov, Nalchik; Vladislav K. Khashirov, Terek, all of U.S.S.R.

[73] Assignee: Kazakhsky Politekhnichesky Institute Imeni V.I. Lenina, Alma-Ata, U.S.S.R.

[21] Appl. No.: 819,522

[22] Filed: Jan. 16, 1986

[51] Int. Cl.⁴ .............................................. E21B 10/48
[52] U.S. Cl. .................................... 175/330; 175/410
[58] Field of Search ............... 175/329, 330, 379, 403, 175/410, 411

[56] References Cited

U.S. PATENT DOCUMENTS 4,359,335 11/1982 Garner ................................. 175/410
4,498,549 2/1985 Jürgens ............................... 175/329

OTHER PUBLICATIONS

Christensen, Impregnation Bit Inovation, Sep. 1982.

Primary Examiner—Stephen J. Novosad
Assistant Examiner—William P. Neuder
Attorney, Agent, or Firm—Ladas & Parry

[57] ABSTRACT

A diamond-impregnated layer of the drilling bit matrix is shaped as a parallelepiped having its front and rear faces inclined. An insert is shaped as a triangular prism, one of whose side faces is rigidly coupled to a weld-on layer, also for the diamond-impregnated layer, and whose face, is rigidly coupled to the inclined rear face of the diamond-impregnated layer.

1 Claim, 4 Drawing Figures

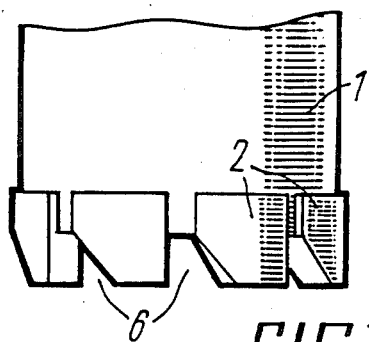
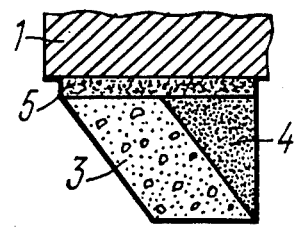
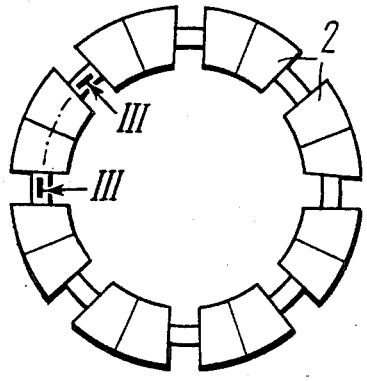
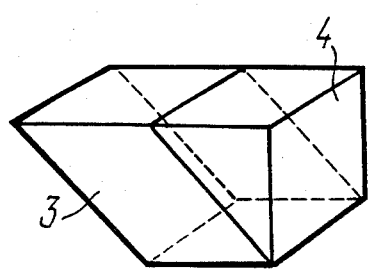

DIAMOND CROWN BIT

TECHNICAL FIELD

The present invention relates generally to rock destruction techniques and more specifically to diamond crown bits for drilling exploratory wells.

The invention is most useful for diamond core drilling of wells in hard rock.

BACKGROUND ART

A number of types of diamond crown bits for core drilling of exploratory wells are known.

One is a diamond crown bit comprising a body and a diamond impregnated matrix which is held to the body by a weld-on layer and subdivided into a number of sectors or teeth by mud discharge ports. The ratio of the sector length to the length of the mud discharge port is equal to 5:1.

The aforesaid heretofore-known drilling bit suffers from low drilling efficiency with respect to hard low-abrasive rock due to the fact that the diamonds are liable to glaze on account of the cooling effected when the drilling sludge gets compressed under the bit end face, this being accounted for by too great a length of the bit sectors.

Another diamond crown bit is known (cf. USSR Inventor's Certificate No. 594,291, Cl. E 21 B 10/48, "Bulletin of inventions and discoveries in the USSR", 1978, No. 7, p. 137 (in Russian). It also has a body and a sector-type matrix held to the body by a weld-on layer for mud discharge ports between the sectors. Higher drilling efficiency is attained in this case due to shorter sectors of the matrix, the ratio of sector length to the mud discharge port length being 3:1.

The disadvantage inherent in said known diamond crown bit resides in reduced strength of attachment of the matrix sectors to the bit body and the resultant breakage and chippage of the sectors in the course of drilling.

One more diamond crown bit is known (cf. U.S. Pat. No. 2,818,233, Cl. E 21 B, published Dec. 31, 1957) for use in core drilling of hard rock, the construction of said bit incorporating a body and a diamond-impregnated toothed matrix. The teeth are reinforced with diamonds having an inclined cutting edge on an inclined end face for the mud discharge ports.

The aforesaid drilling bit is disadvantageous in having too low a service life. The service life is limited by the fact that efficient drilling can be carried out as only until the diamond cutting edges become wornout, which rules out self-sharpening of diamonds. Another disadvantage of said drilling bits is too low tooth endurance.

Still one more diamond crown bit is known (cf. USSR Inventor's Certificate No. 448,266, Cl. E 21 B 10/48, "Bulletin of inventions and discoveries in the USSR", 1974, No. 40, p. 61) to comprise a body carrying a matrix on one end thereof. The matrix is subdivided, by means of mud discharge ports, into a number of working sectors, each comprising a diamond-impregnated layer on a weld-on layer, as well as a spring-loaded insert adjacent to said layers made of an easily destructible abrasive material. In use. the insert of easily destructible material wears to form, together with the drilling cuttings, form an abrasive layer on the hole bottom which exerts a destructive effect upon the matrix. Thus, optimum exposure of diamonds from the bulk of the matrix is attained, which contributes to more efficient operation of the tool.

The aforesaid known drilling bit is disadvantageous in having a sophisticated construction and inadequately reliable holding of the sectors to the matrix, which is accounted for by the considerable height and small length of the sectors.

SUMMARY OF THE INVENTION

It is a primary object of the present invention to provide such a construction of a diamond crown bit that would ensure its efficient operation.

It is another object of the present invention to provide a simpler construction of a diamond crown bit.

It is one more object of the present invention to provide more reliable holding of the diamond-impregnated layer to the weld-on one.

It still more object of the present invention to provide a higher on-bottom drilling rate.

Said and other objects are accomplished in a diamond crown bit, having a body carrying a matrix held to one of the end faces thereof and subdivided into a number of working sectors by mud discharge ports, each of said sectors incorporating a diamond-impregnated layer, a weld-on layer and an insert made of an easily destructible material and adjacent to said layers. According to the invention, the diamond-impregnated layer is shaped as a parallelepiped having its front and rear faces inclined, while said insert is shaped as a triangular prism, one of whose side faces is rigidly held to the weld-on layer and whose face (e.g., hypotenuse) is rigidly held to the inclined rear face of the diamond-impregnated layer.

Such a constructional arrangement of the diamond crown bit makes it possible to obviate glazing of diamonds, reduce the incidence of burning the crown bits and chipping of the working sectors, increase the on-bottom drilling rate and enable efficient drilling in fissured rock, all with a substantially-simplified drilling bit construction.

The essence of the invention under consideration resides in that the contact area of the working sectors with the hole bottom being worked is reduced, which is achieved by making the diamond-impregnated layer in the shape of a parallelepiped having its front and rear faces inclined, while reliable holding of the diamond-impregnated parallelepiped to the bit body is attained by determining, by virtue of the heretofore-known methods, the optimum dimensions of the weld-on layer and by interposing an insert between the diamond-impregnated layer and the weld-on layer, said insert supporting the sector working portion in a required position. The insert is rigidly coupled to the aforesaid layers (e.g., welded on or impregnated jointly with said layers with an impregnant), which precludes undesirable deformation of the diamond-charged layer in the course of drilling. The insert is made of an easily destructible abrasive material so as to provide better exposure of the diamonds during the drilling process. An inclined position of the front face of the diamond-charged layer conduces to reduced dynamic loads on the working sectors when drilling in fissured rock.

Practical application of the invention enables on-bottom drilling rate to be increased by 15 to 20 percent, specific diamond consumption to be reduced by 10 to 15 percent and the range of drillable hard rock to be extended, whenever synthetic diamonds are made use of.

BRIEF DESCRIPTION OF THE DRAWINGS

In what follows the invention will be illustrated by a detailed description of a specific embodiment thereof with reference to the accompanying drawings, wherein:

FIG. 1 is a general schematic view of a diamond crown bit;

FIG. 2 is a diamond crown bit as viewed from the working end thereof;

FIG. 3 is a section taken along the line III—III in FIG. 2; and

FIG. 4 is a fragmentary perspective view of a working sector.

The diamond crown bit (FIGS. 1, 2) comprises a body 1 and a matrix composed of a plurality of sectors 2. Each of the sectors of the matrix (FIG. 3) consists of a diamond-impregnated layer 3 and an insert 4, secured to the crown bit body 1 through a weld-on layer 5.

The diamond-impregnated layer 3 of each sector 2 is shaped as an inclined parallelepiped (FIGS. 3, 4). The top face of the parallelepiped is linked to the weld-on layer 5 of the sector 2, while the opposite face serves as the cutting edge. The rear inclined side face of the parallelepiped is linked to the insert 4, while the opposite face is in fact an inclined face of a mud discharge port 6 (FIG. 1) which is trapezoidal in shape. The construction of the sector 2 resulting from an inclined arrangement of the diamond-impregnated layer 3 makes it possible to increase the adhesion area of the matrix with the drilling bit body 1 and to use higher diamond-impregnated layer, which adds to the service life of the diamond crown bit as a whole.

The inserts 4 are shaped as a triangular prism, one of whose side faces is rigidly secured to the weld-on layer, while the other face, to the inclined rear side face of the diamond-impregnated layer 3. The inerts 4 are made of an easily destructible abrasive material.

The drilling bit of the invention operates as follows.

As the cutting-edge diamonds become worn, the diamonds of the deeper layers are uniformly brought in operation due to an inclined position of the diamond-impregnated layer 3. The thus-established trapezoidal port 6, apart from improving the thermal regime on the hole bottom, is also conducive to a reduced rate of flow of the drilling mud delivery. This in turn provides for carry-away of finer particles of the destructed rock, while heavier abrasive particles resulting from wearing-out of the easily destructible abrasive insert 4, remain on the hole bottom and get under the crown bit face, thus contributing to the self-sharpening of the diamond-impregnated layer 3. The grit size of the abrasive material the insert 4 is made from are so selected as to provide an optimum degree of exposure of the diamond grains of the layer 3 from the bulk of the matrix.

Thus, practical application of the herein-proposed construction of a diamond crown bit will enable, apart from an efficient drilling in hard rock, also better diagnostics of the drilling process to be obtained, as well as will make the drilling process more easily controllable and adaptable to automation.

What is claimed is:

1. A diamond crown bit, comprising:

a body;

a matrix secured on one of the end faces of said body;

mud discharge ports subdividing said matrix into sections separated from one another;

each said sector consisting of:

a weld-on layer on said one end face of said body whereby said sectors are held to said body;

a diamond-impregnated layer shaped as a parelleleipiped and held to said weld-on layer to have its front and rear faces inclined; and an insert shaped as a triangular prism having side face rigidly held to the weld-on layer and its face face rigidly held to the inclined rear face of the diamond-impregnated layer.

* * * * *